(12) United States Patent
Sakai et al.

(10) Patent No.: US 7,426,048 B2
(45) Date of Patent: Sep. 16, 2008

(54) IMAGE FORMING APPARATUS, CONTROLLING METHOD, AND CONTROL PROGRAM

(75) Inventors: Katsuya Sakai, Tokyo (JP); Tomoaki Endoh, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 841 days.

(21) Appl. No.: 10/339,318

(22) Filed: Jan. 10, 2003

(65) Prior Publication Data

US 2003/0137682 A1 Jul. 24, 2003

(30) Foreign Application Priority Data

Jan. 21, 2002 (JP) ............................. 2002-011466
Oct. 4, 2002 (JP) ............................. 2002-292430

(51) Int. Cl.
*G06F 15/00* (2006.01)
*G06F 9/44* (2006.01)

(52) U.S. Cl. .................... 358/1.14; 358/1.15; 717/120; 717/131; 717/171; 717/176; 399/10; 399/11; 399/24

(58) Field of Classification Search .............. 358/1.15, 358/1.13, 1.14; 399/10, 11, 24; 717/159, 717/120, 131, 171, 176

See application file for complete search history.

(56) References Cited

U.S. PATENT DOCUMENTS

| | | | | |
|---|---|---|---|---|
| 5,925,127 A | | 7/1999 | Ahmad | 713/200 |
| 6,202,092 B1 * | | 3/2001 | Takimoto | 709/225 |
| 7,010,787 B2 * | | 3/2006 | Sakai | 717/159 |
| 2001/0034713 A1 | | 10/2001 | Nakai et al. | 713/200 |

FOREIGN PATENT DOCUMENTS

| | | |
|---|---|---|
| JP | 2001-092779 | 4/2001 |
| JP | 2001092779 A * | 4/2001 |

* cited by examiner

*Primary Examiner*—Chan S. Park
(74) *Attorney, Agent, or Firm*—Fitzpatrick, Cella, Harper & Scinto

(57) ABSTRACT

An image forming apparatus in which programs for controlling processes that are provided by the image forming apparatus are installed. The image forming apparatus includes means for managing the use amount of each program by use of a counter, means for recognizing the counter which corresponds to the identification information of the program and can manage the use amount of the program, means for correlating the program with the counter recognized by the recognizing means to manage the counter, means which can set an upper limit on the use amount of each program for the use amount managing means, and means for controlling the process by the image forming apparatus based on the upper limit of the use amount set by the setting means for each of the types of the programs.

14 Claims, 19 Drawing Sheets

FIG. 4

| COUNTER NUMBER | APPLICATION ID |
|---|---|
| 1 | 11 |
| 2 | 0xFFFFFFFF |
| 3 | 51 |
| 4 | 0xFFFFFFFF |
| ⋮ | ⋮ |
| N | 0xFFFFFFFF |

FIG. 7

| COUNTER NUMBER | FOR COPYING | FOR PRINTING | FOR SCANNING | |
|---|---|---|---|---|
| 1 | 5 | 10 | 10 | (a) |
| 2 | 0 | 10 | 0 | |
| 3 | 75 | 0 | 50 | |
| ⋮ | ⋮ | ⋮ | ⋮ | (b) |
| N | 0 | 0 | 0 | |
| TOTAL NUMBER COUNTER | 80 | 20 | 60 | |
| | (e) | (d) | (c) | |

FIG. 12

1201
| FOR COPY COUNTER | |
|---|---|
| COUNTER NUMBER | APPLICATION ID |
| 1 | 0xFFFFFFFF |
| 2 | 0xFFFFFFFF |
| 3 | 0xFFFFFFFF |
| ⋮ | ⋮ |
| N | 0xFFFFFFFF |

1202
| FOR SCAN COUNTER | |
|---|---|
| COUNTER NUMBER | APPLICATION ID |
| 1 | 11 |
| 2 | 0xFFFFFFFF |
| 3 | 0xFFFFFFFF |
| ⋮ | ⋮ |
| N | 0xFFFFFFFF |

1203
| FOR PRINT COUNTER | |
|---|---|
| COUNTER NUMBER | APPLICATION ID |
| 1 | 0xFFFFFFFF |
| 2 | 0xFFFFFFFF |
| 3 | 0xFFFFFFFF |
| ⋮ | ⋮ |
| N | 0xFFFFFFFF |

1204
| FOR COLOR COPY COUNTER | |
|---|---|
| COUNTER NUMBER | APPLICATION ID |
| 1 | 0xFFFFFFFF |
| 2 | 0xFFFFFFFF |
| 3 | 0xFFFFFFFF |
| ⋮ | ⋮ |
| N | 0xFFFFFFFF |

1205
| FOR COLOR PRINT COUNTER | |
|---|---|
| COUNTER NUMBER | APPLICATION ID |
| 1 | 0xFFFFFFFF |
| 2 | 0xFFFFFFFF |
| 3 | 0xFFFFFFFF |
| ⋮ | ⋮ |
| N | 0xFFFFFFFF |

1206
| FOR GENERAL-USE COUNTER | |
|---|---|
| COUNTER NUMBER | APPLICATION ID |
| 1 | 11 |
| 2 | 0xFFFFFFFF |
| 3 | 0xFFFFFFFF |
| ⋮ | ⋮ |
| N | 0xFFFFFFFF |

FIG. 14

| VENDOR NAME | KANON CO., LTD. |
|---|---|
| APPLICATION ID | 11 |
| APPLICATION NAME | OCR SCAN C |
| VERSION | 1.0 |
| LATEST UPDATING DATE | 2000/12/24 |
| USE COUNTER NUMBER | 2 |
| COUNTER TYPE | FOR GENERAL USE |
| COUNT UP UNIT | 1 |
| COUNTER TYPE | SCAN |
| COUNT UP UNIT | 10 |
| USE MEMORY | 65535 |
| ARCHIVE FILE URL | http://hoge/ocr10.jar |

FIG. 16

| COUNTER NUMBER | FOR COPY | FOR SCAN | FOR PRINT | FOR COLOR COPY | FOR COLOR PRINT | FOR GENERAL USE |
|---|---|---|---|---|---|---|
| 1 | 0 | 80 | 0 | 0 | 0 | 4 |
| 2 | 0 | 0 | 0 | 0 | 0 | 0 |
| 3 | 0 | 0 | 0 | 0 | 0 | 0 |
| ... | ... | ... | ... | ... | ... | ... |
| N | 0 | 0 | 0 | 0 | 0 | 0 |
| FOR TOTAL NUMBER COUNT (0) | 0 | 0 | 0 | 0 | 0 | 4 |

(a) 80 (for scan, counter 1)
(b) 4 (for general use, total)

FIG. 19

| COUNTER NUMBER | FOR COPY | FOR PRINT | FOR SCAN | |
|---|---|---|---|---|
| 1 | 1000 | 2000 | 1000 | (a) |
| 2 | 0 | 1000 | 0 | |
| 3 | 1500 | 0 | 300 | (b) |
| ⋮ | ⋮ | ⋮ | ⋮ | |
| N | 0 | 0 | 0 | |
| | (c) | (d) | (e) | |

IMAGE FORMING APPARATUS, CONTROLLING METHOD, AND CONTROL PROGRAM

BACKGROUND OF THE INVENTION

1. Field of the Invention

The present invention relates to an image-forming apparatus in which programs for controlling operations in the apparatus are installed, a method of controlling the same, and a control program.

2. Description of the Related Art

Hitherto, as mechanisms for counting the total output numbers (e.g., the total cumulative number of pages printed) of image-forming apparatuses, hard counters having mechanical structures have been generally used. With the hard counters, it is difficult to change the count, e.g., reduce it after the count-up is carried out. Thus, the hard counters are means suitable for use in service accounting systems due to the above-described feasibilities thereof. On the other hand, the functions of image forming apparatuses have been complicated. Accordingly, there has been increasing demanded for the service accounting system to be divided depending on the intended use, e.g., "small-size"/"large-size", "color"/"black and white", and "copy/print/FAX". To satisfy this demand, simply, the number of hard counters has been increased. Moreover, it has been proposed that soft counters can realize a large number of counters at a reduced cost with small spaces (A "soft counter" is one that stores a count value in a semiconductor memory.).

Regarding prior art soft counters, information in a memory is ready to be lost, and the reliability is low. Thus, a plurality of memory units are prepared, and the same values are stored in the memory units. If internal information in a memory is lost, the information is compensated by use of the information stored in another of the memory units. Thereby, the reliability is enhanced. Soft counters can be prepared for each function to be counted, so that correct count information can be maintained for each function. Hereinafter, in the specification, the soft counter is referred to as a "counter", for brevity. In the present invention, "counter" is the general term for a means which can count and store different kinds of use amounts such as the execution numbers of programs in printers, facsimiles, scanners, copying machines, or composite machines of several of these sets of capabilities which are typical examples of image forming apparatus, the operation number of the apparatus, the use durations of application programs, and so forth.

A printing machine in which a counter is provided for each of different programs installed in an image forming apparatus is under development. Moreover, a printing machine has been developed in which a user can use different services by execution of the different programs installed in the printer. For example, as described in Japanese Patent Laid-Open No. 2001-92779, software techniques for image forming apparatuses have been increased, and different types of software which realize operations in the image forming apparatus can be more easily added, altered, deleted, and so forth. Furthermore, a printer in which a counter is fixedly provided for each application to count the execution number of the application is under investigation.

SUMMARY OF THE INVENTION

However, for installed applications, different types of programs such as control programs, and data, addition, alteration, and deletion have been possible. Therefore, it is inconvenient that counters are allocated in advance and fixedly to the various processes which are provided by an image forming apparatus.

In particular, the opportunity for programs for providing operations in the image forming apparatus to be changed, has increased. Problematically, the functions of the image forming apparatus cannot suitably be managed by means of conventional static counter management. Moreover, a printer which provides composite functions has been developed. It becomes a problem to manage the use amounts of the functions respectively.

It is one of the features of the present invention to provide an image forming apparatus which can flexibly cope with changes in the configuration of functions provided by different types of programs installed in the image forming apparatus.

In particular, it is another feature of the present invention to provide an image forming apparatus in which counters for managing the use amounts of programs can be dynamically managed, so that the use conditions of the respective programs can be appropriately grasped even if the functions of the image forming apparatus and the program configuration are changed.

It is still another feature of the present invention to provide an image forming apparatus in which for the respective processes provided by the programs installed in the image forming apparatus, e.g., an upper limit on the use amount of a program can be set, so that the use amount of each program can be easily managed.

It is yet another feature of the present invention to provide a mechanism by which the use licenses of applications can be given to users in advance in the form of license information with respect to each type of the applications and/or for each of the used devices.

According to the present invention, there is provided an image forming apparatus which can solve the above-described problems.

An image forming apparatus of the present invention in which programs for controlling processes that are provided by the image forming apparatus are installed, comprises means for managing the use amount of each program by use of a counter, means for recognizing the counter which corresponds to the identification information of the program and can manage the use amount of the program, means for correlating the program with the counter recognized by the recognizing means to manage the counter, means which can set an upper limit for the use amount of each program for the use amount managing means, and means for controlling the process by the image forming apparatus based on the upper limit for the use amount set by the setting means for each of the types of the programs.

For example, in a case where a job using a predetermined function is submitted, the processing can be performed is the use amount is below an upper limit set in the image forming apparatus. The processing is limited if it exceeds the upper limit.

Further objects, features and advantages of the present invention will become apparent from the following description of the preferred embodiments (with reference to the attached drawings).

BRIEF DESCRIPTION OF THE DRAWINGS

FIG. 4 illustrates an example of a counter number —application ID table according to the first embodiment.

FIG. 7 is a flowchart of a counter contained in the composite machine of the first embodiment.

FIG. 12 shows an example of a counter number—application ID table according to the second embodiment.

FIG. 14 shows an example of the configuration of application information according to the second embodiment.

FIG. 16 shows an example of a counter contained in the composite machine according to the second embodiment.

FIG. 19 shows a counter upper limit value management table.

DESCRIPTION OF THE PREFERRED EMBODIMENTS

First Embodiment

Figure 1:
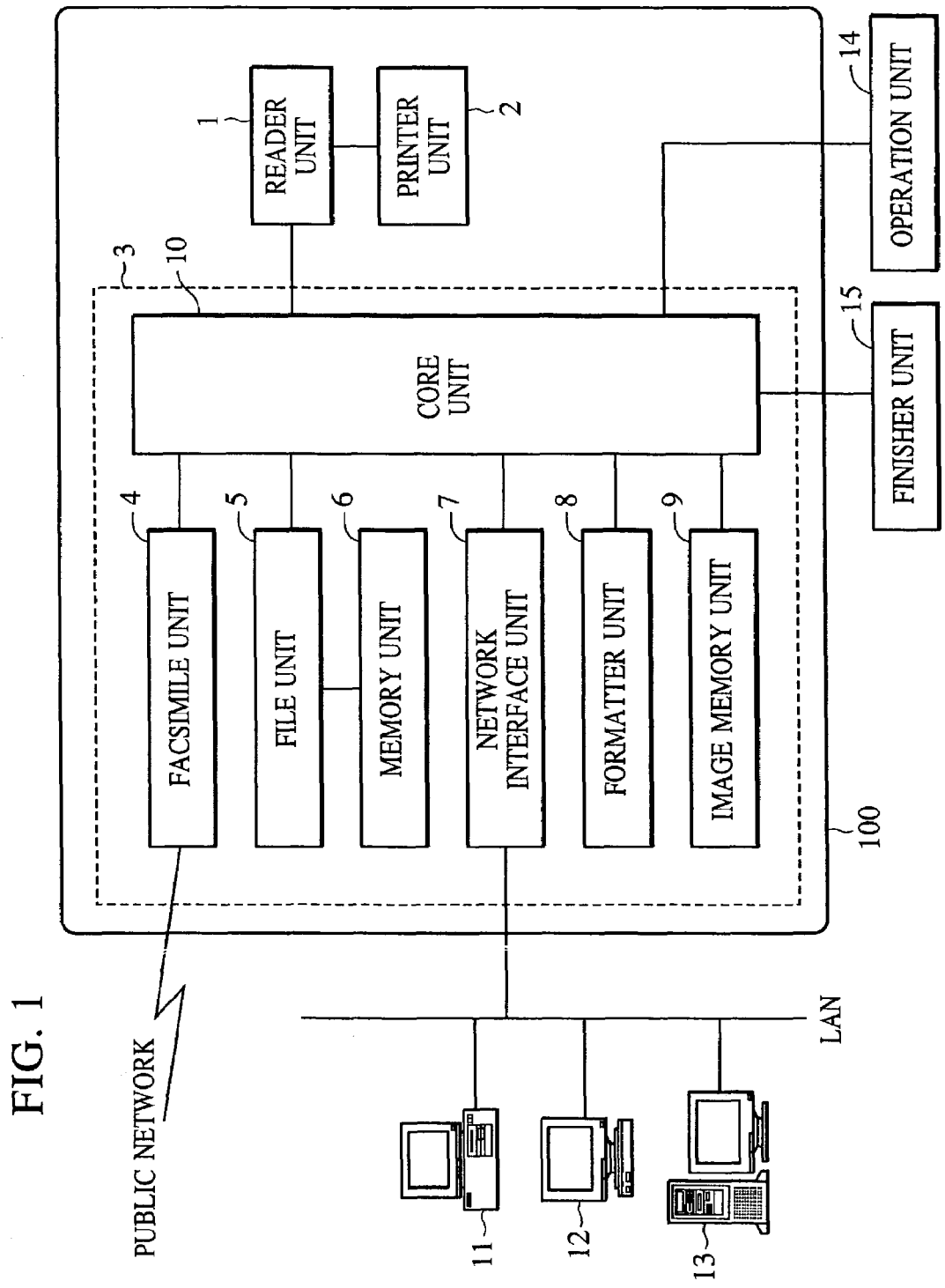
FIG. 1 is a block diagram showing the configuration of a whole system according to a first embodiment of the present invention.

FIG. 1 is a block diagram showing the configuration of a whole system according to a first embodiment of the present invention. In FIG. 1, a composite machine 100, which is a typical example of an image forming apparatus, has functions as a scanner, a printer, a copier, and a facsimile which are integrated together. The composite machine 100 is connected via a network to a network server 12, which is a typical example of an external information processor, and a host computer 11, which is a typical example of an information processor. Moreover, the composite machine 100 is connected to other communication equipment via a public network. It should be noted that the composite machine 100 is not restricted to what is illustrated. The composite machine may be a digital copying machine, a printer having a copying function, or the like. The number of pieces of peripheral equipments connected to the network is not limited to what is illustrated. The image forming apparatus also is not restricted to the composite machine 100, and may contain a printing machine such as a facsimile, a printer, or the like, a single-function device which can form an image, such as a scanner or the like, and a controller contained in the respective apparatus. The counter may be fixed to a network board, e.g., a network interface 7 for different types of printers.

The composite machine 100 mainly comprises a reader unit 1, a printer unit 2, and an image input-output control unit 3. The reader unit 1 is connected to the printer unit 2 and the image input-output control unit 3, and reads an original image and outputs the read image data to the printer unit 2 or the image input-output control unit 3. The printer unit 2 prints the image data output from the reader unit 1 and the image input-output control unit 3 on recording paper. The image input-output control unit 3 is connected to an external network or a public network, and inputs-outputs image data, and stores use-amounts of the composite machine generated when a user uses the machine. Moreover, the image input-output control unit 3 analyzes or controls a job (e.g., a print command or the like) sent from the host computer connected to the network.

The image input-output control unit 3 comprises a facsimile unit 4, a file unit 5, a network interface unit 7 which is an acquiring means, a PDL formatter unit 8, and a core unit 10. The facsimile unit 4 is connected to the core unit 10 and the public network. The unit 4 expands image data received via the public network and compressed, and transmits the expanded image data to the core unit 10. Also, the facsimile unit 4 compresses image data sent from the core unit 10, and transmits the compressed image data to the public network via a public circuit. The file unit 5 is connected to the core unit 10 and the memory unit 6. The file unit 5 compresses image data sent from the core unit 10 and causes the compressed data together with a keyword sent from the core unit 10 to be stored in the memory unit 6. The memory unit 6, which is a typical example of the storing means, uses a hard disk drive according to this embodiment. However, the unit 6 is not restricted to a hard disk. Moreover, the file unit 5 retrieves compressed image data based on a keyword sent from the core unit 10, reads the compressed image data to expand, and then, sends the data to the core unit 10.

The network interface unit 7 comprises interfaces between the host computer 11, the network server 12, and the core unit 10. Receiving job control data from the host computer 11 and sending image data or the like to the host computer 11 are carried out via the network interface unit 7. The job control data includes a job control command which is sent together with PDL data. In this case, for example, the PDL data is expanded and printed as image data, and then, the recording paper is processed into a stable sort, and is discharged. A database called MIB (Management Information Base) is configured in the network interface unit 7. The unit 7 can communicate with the host computer 11 provided in the network to manage the printer unit 2. Moreover, the network interface unit 7 is configured in such a manner that other devices connected to the network can control applications in the composite machine 100 to accept requests for installing applications by which the different functions of the image forming apparatus can be realized, and those for uninstalling applications, starting, terminating, or the like.

The formatter unit 8 is connected to the core unit 10, and expands PDL data sent from the host computer 11 to be image data which can be printed in the printer unit 2.

The image memory unit 9 temporarily stores information sent from the reader unit 1 and from the host computer 11 or the like via the network interface unit 7.

The core unit 10 which is a suitable example of a unit to function as storing and also analyzing means controls data or the like which are sent between the reader unit 1, the facsimile unit 4, the file unit 5, the network interface unit 7, and the PDL (Page Description Language) network interface unit 7, respectively, and moreover, analyzes job control data to store information such as the situations of a user, the numbers of copying or printing sheets, and the number of scanning sheets.

The host computer 11 (information processor) is a personal computer or a work station (PC/WS). The network server 12 controls the whole network. An accounting server 13, which is an example of an external information processor, includes a server for managing accounting information of the composite machine 100. The accounting server 13 can display on its display a use amount which is counted by a counter provided in the composite machine 100 for management. An operation unit 14 includes an operation panel. For example, an application to be carried out and a function of the composite machine to be used for the application can be selected and input by use of a touch panel. Moreover, a command for executing an application can be input through the operation unit 13 of the composite machine 100. The execution command can be also input through the network server 12 which is an example of the external information processor. The use amount of the executed application is counted by the counter contained in the composite machine 100. This will be described below in detail.

Figure 2:
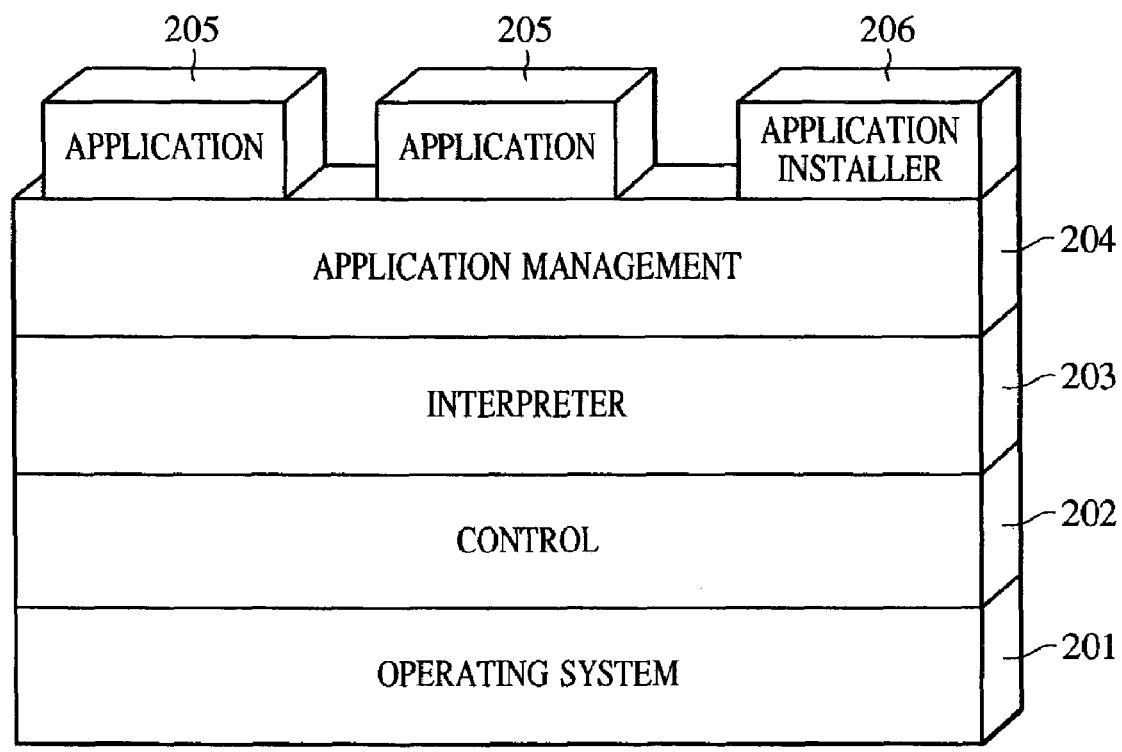
FIG. 2 illustrates a suitable example of the software module hierarchy of a composite machine according to a first embodiment of the present invention.

FIG. 2 illustrates an example of the software module hierarchy of the image forming apparatus of the first embodiment. The software module contains an operating system (OS) 201, a controller module 203 for controlling different types of devices at the upper-level next to the system OS 201, and an interpreter module 203 for sequentially executing programs at the next upper-level. Further, the software module contains an application management module 204 for managing at least two dynamically-detachable application groups at the upper-level next to the interpreter module 203. Applications 205, which realize different types of functions, are operated under management by the application management module 204. An application module for offering the service of the composite machine can be operated via the interpreter module 203. For example, an application module acquired through the external server unit is incorporated into the image forming apparatus, and correspondingly, the application management module 204 adds an application 205 as a management object. On the other hand, an application program is deleted from the image forming apparatus, and correspondingly, the application management module 204 can remove an application 205 from the management objects.

An application installer 206 for installing or uninstalling an application 205 can be operated under management by the application management module 204. The applications, which are typical examples of programs, are cooperated with the image forming apparatus to offer different types of processes to users. For examples, applications for processing and compressing images, application programs for managing a section such as print-restricting and so forth, plug-in modules to be incorporated in as a part of an application, line-programs for remote-managing a composite machine, applications for controlling a unit such as finisher in a composite machine to book-bind, programs for converting and analyzing special document data, document-preparation programs, e.g., for word-processing, schedule-management programs, spread-sheet programs, database management programs, and server programs for realizing print-service via an internet are available.

The above-described software is executed under the CPU (not shown) provided in the core unit 10. According to the above-described embodiment, the interpreter and the operation system OS are incorporated in the composite machine. Needless to say, the above-described module configuration is not restrictive, provided that the application 205 operates in the image forming apparatus, and the application management module 204 appropriately operates.

Figure 3:
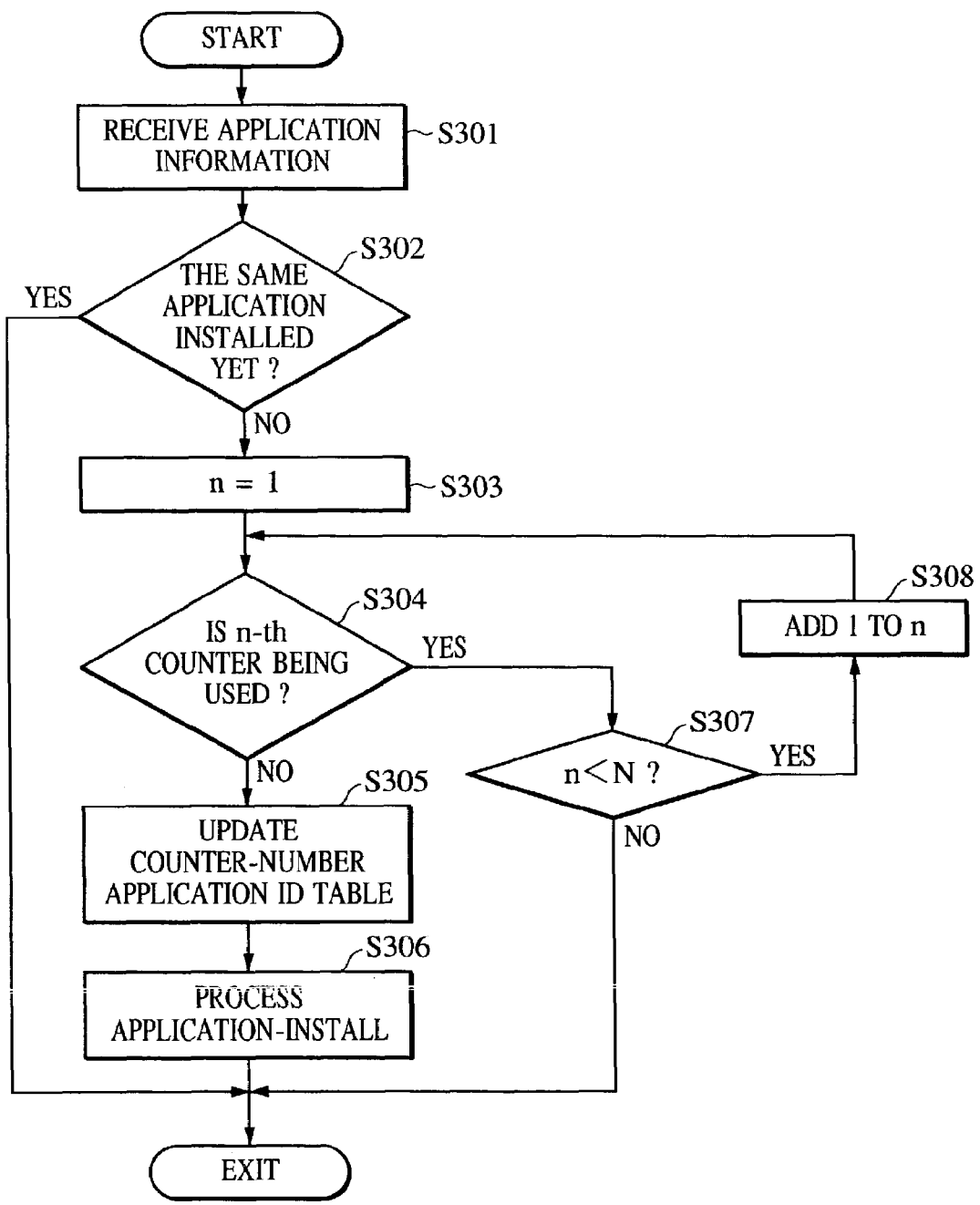
FIG. 3 is a flowchart showing the flow of processes executed when an application is installed in the composite machine of the first embodiment shown in FIG. 1.

FIG. 3 is a flowchart of the processes executed when an application is installed in the composite machine 100. Hereinafter, the processes in the application installer 206 executed when a new application is installed from the host computer 11 into the composite machine 100 will be described with reference to FIG. 3. When a designation showing that an application is to be installed is input by a pointing device (not shown) which is a preferred example of a designation-inputting means, the processing illustrated in FIG. 3 starts. First, application information is received from the host computer 11 in step S301, and includes a vendor name, application ID, an application name, a use memory, a version number, and the latest updating date, which are typical examples of program attribute information. This application information is used to manage the use amount of the application which is a typical example of program.

At step S301, the application installer 206 receives the application information including the application ID, which is a typical example of the above-described program attribute information. The application installer 206 executes the processing at step S302. In step S302, the application installer 206 determines whether the same application has been installed or not. The application installer 206 acquires the application information received at the step S301, and compares it with the application information of an application which has been already installed to determine whether the same application has been already installed or not. If the application installer 206 determines that the same application exists at the step S302, the processing terminates. If it is determined that the same application does not exist, the processing advances to step S303. In step S303, the application installer 206 (determining means) assigns 0 to variable n. The processing advances to step S304, in which the application installer 206 determines whether the n-th application counter is being used or not. If it is not being used, the processing advances to step S305. In step S305, a counter number—application table ID is updated, so that the counter number n is made to coordinate to the application ID. In this specification, the counter counts the execution number (i.e., times executed) of an application which is an example of the use amount of the application. Moreover, the counter contains a measuring and storing means which can count and retain the use time of an application such as a period of time for leading the application.

FIG. 4 shows an example of the counter number—application ID table. The following is shown: the counter with a counter number of 1 corresponds to the application with an application ID number of 11, the counter with a counter number of 3 corresponds to the application with an application ID number of 51, and the other counters are not in use. The processing, after the table is updated at step S305, advances to the next steps, S306. At step S306, the application is downloaded from the host computer, and is stored in the memory unit 6 of the composite machine 100, so that the application is ready to be used. Then, the processing terminates. On the other hand, if it is determined that the n-th counter is under use, the processing advances to the step S307. In step S307, the variable is increased by 1, and then, the processing advances to the step S308. In step S308, the application installer 206 determines whether the variable n is smaller than the total number N of the counters for each application prepared in the composite machine 100. If the variable n is smaller than the total number N of the counters for each application, the processing returns to step S304. Otherwise the processing terminates.

As described above, the installed applications execute a command groups for directing job processes so that the reader unit, the printer unit, or the like can be controlled, and different functions can be realized.

Figure 5:
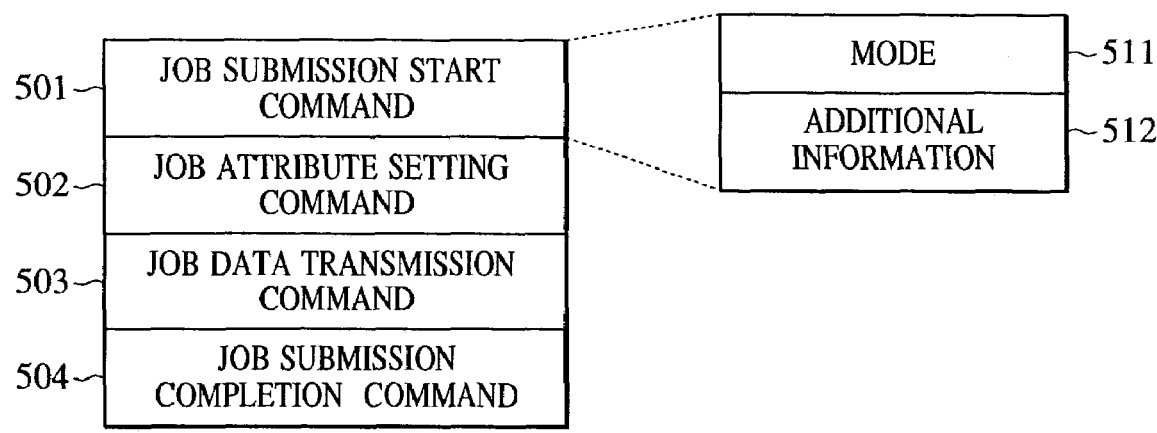
FIG. 5 illustrates an example of a command group for instructing job-processing.

FIG. 5 shows an example of a command group of which each command directs a job process to be executed. The command group for directing the job processes comprises a job submission start command 501, a job attribute setting command 502, a job data transmission command 503, and a job submission completion command 504. The job submission start command 501 posts the start of job-submission to the controller, and includes a mode 511 as a parameter and additional information 512 depending on the mode. The controller starts the preparation for processing a job, when the job submission start command 501 is received. The job attribute setting command 502 sets an attribute representing the function and state of a job. As the attributes, an application ID, the name of a job, the type of the job, data form, the selection of paper sheet, and so forth are available. At least two attributes can be continuously set by the commands.

The job data transmission command 503 can be executed to send data, such as image data, which is an object for job-processing. There are cases in which no data as a processing object is required, depending on the contents of the jobs. In these cases, this command may be omitted. The job submission completion command 504 can be executed to inform that all the commands of the group for directing the job processing have been already sent. The group comprising a series of the commands from the job submission start command 501 to the job submission completion command 504 is interpreted as one job-processing command. The controller, when the job-processing is instructed, controls the reader unit 1, the printer unit 2, the file unit 5, and so forth, and processes them based on given attributes thereof, and request to update the counter suitably depending on the types of the job. Moreover, since the job start command includes the application ID information of the application which executes the job start command, the controller and the counter updating means can determine what application the present job is executed starting from.

Figure 6:
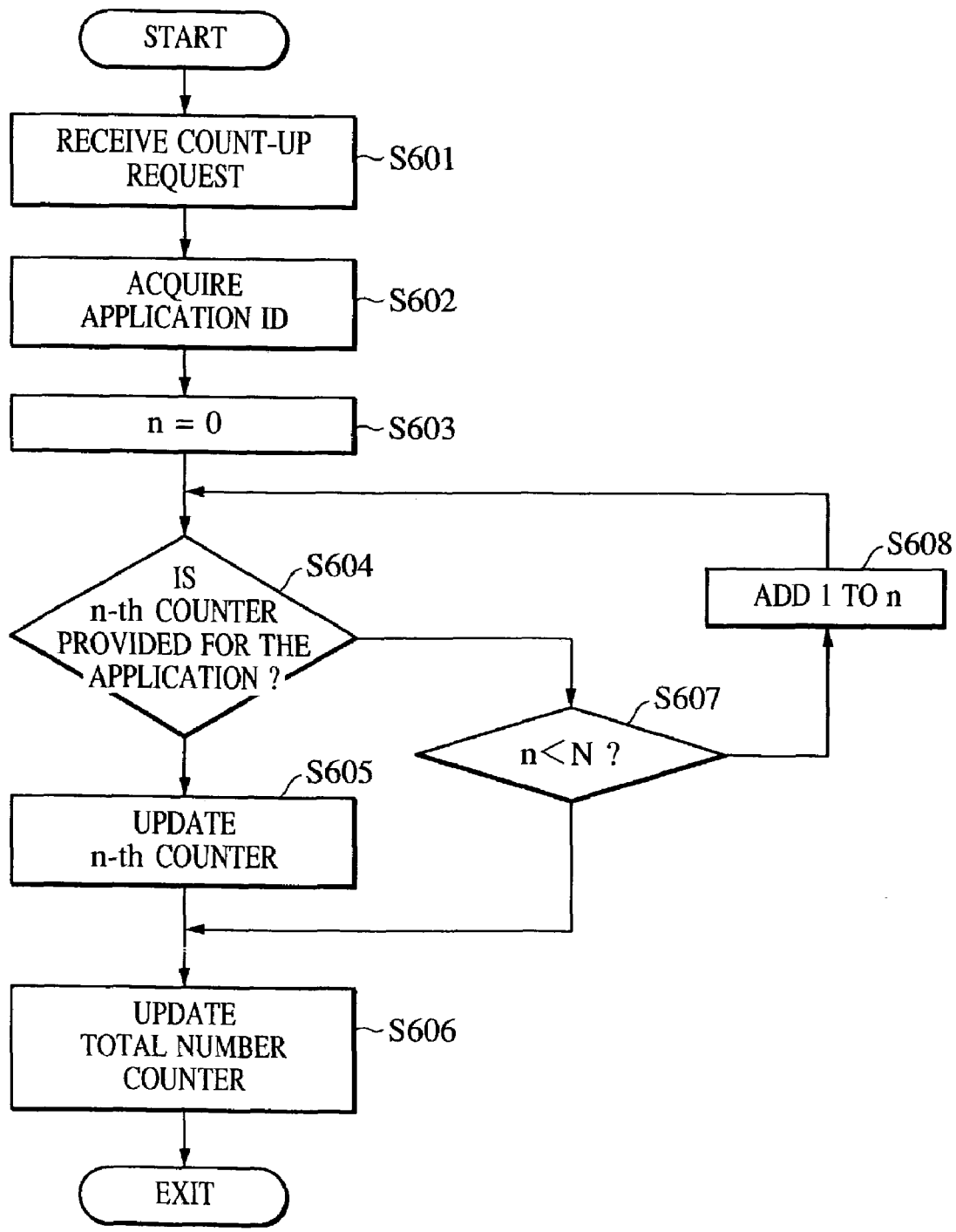
FIG. 6 is a flowchart of processes executed by a counter updating means when the counter is updated according to the first embodiment.

FIG. 6 is a flow chart of the processes executed in the counter updating means when a counter is updated according to the first embodiment. The flow of the processes executed in a counter managing means when the counter is updated. First, in step S601, a counter updating request is received. The processing proceeds to step S602. At the step S602, the counter updating means acquires the ID of the application of which the updating is requested, and the processing proceeds to step S603. The counter updating means assigns 0 to variable n, and the processing proceeds to step S604. In step S604, it is checked whether the n-th counter is assigned to the application with the application ID acquired in step S604 or not by reference to the table. If the n-th counter is assigned to the application with the application ID acquired in step S602, the processing proceeds to step S605. In step S605, the n-th counter for the present job type is updated. The processing proceeds to step S606, where the counter for counting the total number is updated, and then the processing terminates. On the other hand, if it is determined in step S604 that the n-th counter is not assigned to the application with the application ID acquired in step S602, the processing proceeds to the step S607. In step S607, it is determined whether the variable n is smaller than the total number N for the counters for the applications or not. If n<N, the n value is increased by 1 in step S608, and the processing is returned to step S604. If n<N is not satisfied in step S607, the processing proceeds to step S606, and only the counter for counting the total number is updated, and then the processing terminates.

FIG. 7 shows counters contained in the composite machine 100 by way of example. In this example, three-type counters, namely, a copy counter, a print counter, and a scan counter, are prepared. For each of these counters, one counter for counting the total number is provided, and N counters (counter number of 1 to N) are prepared for each application. When the copy job is processed, the copy counter counts up every time copying is carried out on one sheet. Similarly, for the scan job, the scan counter counts up every time one sheet is canned. For the print job, the print counter counts up every time printing is carried out one sheet.

If the content of the counter number—application ID table is the same as that shown in FIG. 4, the counters represented by (a) in FIG. 7 are used by the application with an application ID number of 11. The counters represented by (b) in FIG. 7 are used by the application with an application ID number of 51. For example, when the application with an application ID number of 11 carries out the copy job, the counter represented by (c) in FIG. 7 and the counter for counting the total number count up. Similarly, when the print job is carried out, the counter represented by (d) in FIG. 7 and the counter for counting the total number count up. Also, when the scan job is carried out, the counter represented by (e) in FIG. 7 and the counter for counting the total number count up. In the case in which a print job, a scan job, a copy job, or the like is submitted from a remote host, and the application ID of the application which issues one of the jobs has been already registered in the table, the counter corresponding to the application ID and the total number counter count up. If the application ID of the application which issues the job is not registered, the job is rejected.

As described above, count values of which the number is equal to that of the combinations of the functions provided by the image forming apparatus with the applications using the respective functions can be managed. Moreover, the respective count values can be summed for each application and for each function. Thereby, not only accounting for each application but also the use amount for each processing using a predetermined function of the image forming apparatus in an application, called predetermined operation, can be counted. For example, in the case in which a special image processing application coordinates to the counter number of 6, predetermined image processing such as copying including electronic meshing is executed by use of an image processing application, the counter for copy which coordinates to the counter number of 6 counts up. Thereby, the use amount of the predetermined operation such as copying using the image processing application can be managed. Needless to say, as the application, not only the image processing application but also an application for processing an XML document or processing a predetermined document file is available. Moreover, as the functions which are provided by the image forming apparatus, not only the copy, the print, and the scan functions but also so-called bookbinding processing such as finishing, bookbinding, punching, or the like may be available.

Figure 8:
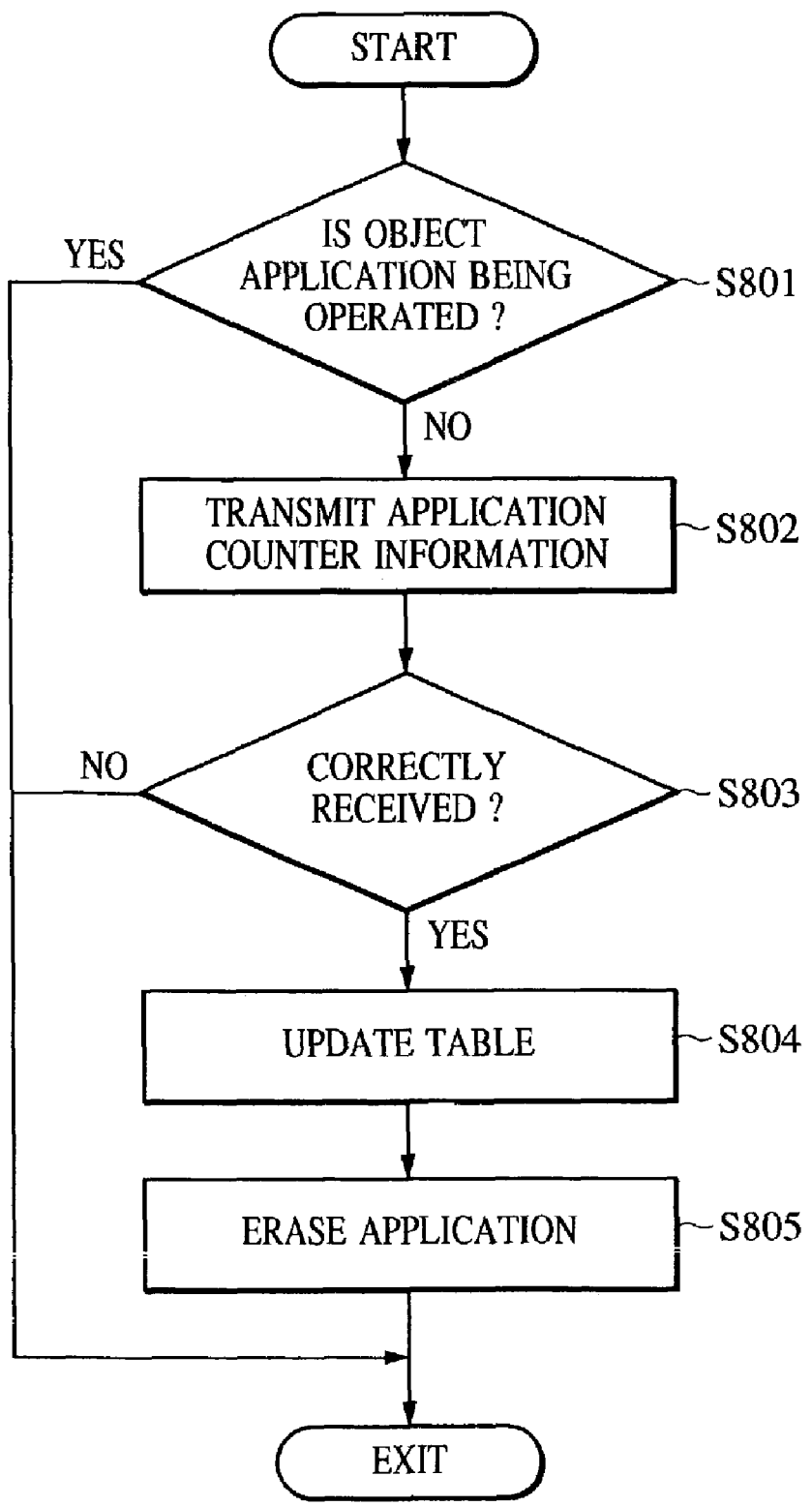
FIG. 8 is a flowchart of the processes executed when the installed application is uninstalled in the composite machine according to the first embodiment.

Hereinafter, processing carried out when uninstalling the application allocated to the counter having an application ID already installed will be described below. FIG. 8 is a flowchart showing the sequence of operations carried out when an application already installed in the composite machine 100.

First, in step S801, it is checked whether a specified application is under operation. If the application is under operation, the uninstalling terminates without further processing. If the application is not under operation, the processing proceeds to step S802, since the uninstalling can be safely carried out. In step S802, the counter information and the application information correlated to the application to be uninstalled are transmitted to the accounting server 13, and the processing proceeds to step S803. In step S803, it is checked whether the transmitted information has been correctly received by the accounting server 13. In the case where the information has been correctly received, the processing proceeds to step S804. In the case where the information has not been correctly received, the uninstalling is not carried out in practice, and the processing terminates. In step S804, the counter number—application ID table is updated, so that the counter allocated to the application ID of the application to be uninstalled is made to be free. In step S805, the application is erased from the memory unit 6 to be uninstalled, and the processing terminates.

As described above, according to this embodiment, counters being free when an application is installed is dynamically allocated to the application. Counters corresponding to an application which executes the processing count up. Thereby, the count numbers for copy, print, and scan can be managed for each application.

Moreover, when the application is uninstalled, the application information and the information of the used counter are stored in the accounting server. Accordingly, the application can be installed and uninstalled freely and repeatedly without the count information being damaged.

According to the present embodiment, in the case where the same application has been already installed at installing, the processing terminates. The version information is determined. If the version is new, the application may be automatically installed, or alternately, a user may determine whether he continues the installing or not.

According to this embodiment, the three types of counters, that is, the copy counter, the print counter, and the scan counter are prepared. The counters are not restricted to the above-described ones. More different types of counters may be provided. Counters having the same function may be finer divided depending on the size of sheets or the like.

According to this embodiment, one application is allocated to one set of counters. At least two applications may use the same set of counters.

Also, according to this embodiment, all the counters excluding ones for counting the total numbers are dynamically allocated. For the applications previously mounted onto the image forming apparatus, counters are fixedly allocated.

Moreover, according to this embodiment, an external job having an application ID not registered in the table is rejected. The job may be accepted on the condition that only the counters for count the total numbers count up.

Second Embodiment

Hereinafter, an image forming apparatus according to a second embodiment of the present invention will be described.

FIG. 1 also shows an image forming apparatus according to the second embodiment. This drawing is described in the First Embodiment, and is not again described here. It should be noted that the host computer in the second embodiment is a file server in which applications are stored. Hereinafter, especially, differences between the first and second embodiments will be described.

Figure 9:
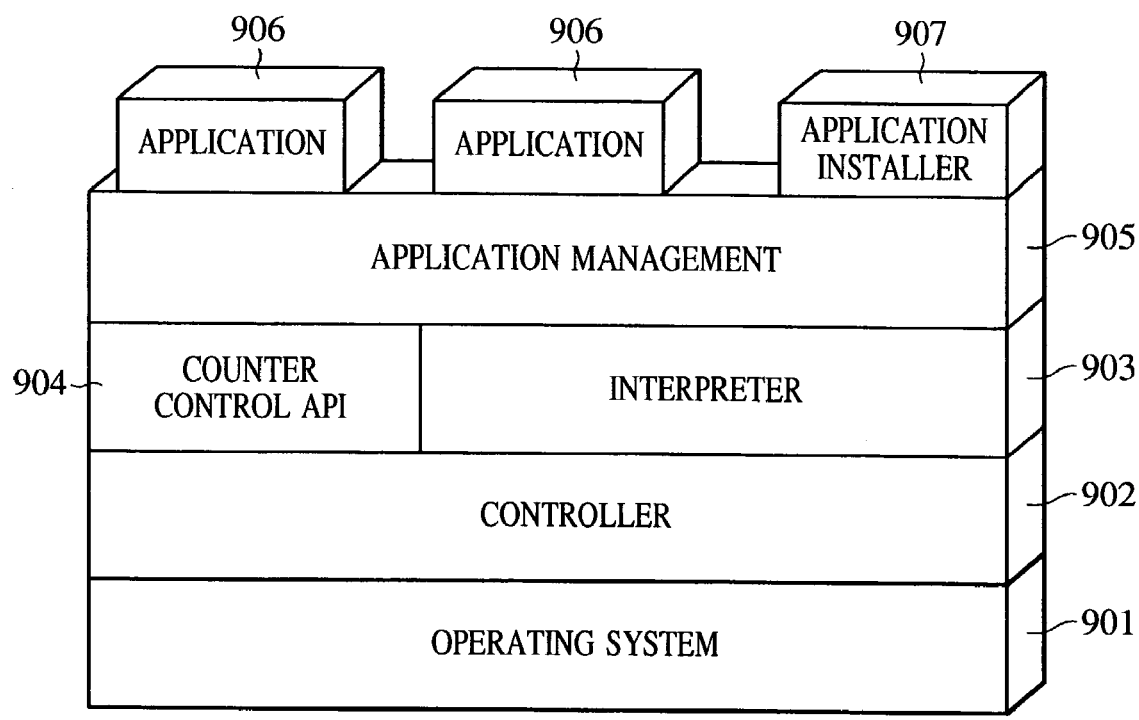
FIG. 9 shows the configuration of the software module hierarchy of a composite machine according to a second embodiment of the present invention.

FIG. 9 shows the structure of a software module hierarchy of the composite machine 100 according to the second embodiment. The software module contains an operating system (OS) 901, a controller module 902 for controlling different devices at the next upper-level, and an interpreter module 903 for sequentially executing programs and a general-use counter control application program interface 904 (hereinafter, referred to as general-use counter control AP1) 904 at the nest upper-level. The software module further contains an application management module 905 for a group of dynamically detachable applications at the upper level nest to the interpreter module 903 and the general-use counter control API 904. Applications 906 which realize different functions are operated under the application management module 905 (use-amount managing means). An application installer 907 for installing and uninstalling an application is also operated under the application managing module 905. The respective applications 906 can use the general use counter control AP1904 via the application management module 905. The software can be executed under CPU (not shown) provided in the core unit 10.

Hereinafter, the operations of the application installer 907 carried out when an application stored in the host computer 11 is installed in the composite machine 100 will be described with reference to FIGS. 10 and 11. A WEB server is installed in the host computer, and has a predetermined URL. For example, in this embodiment, an application is allocated to the URL of http://www.kaisha.cpm/appfile. When this URL is specified in the operation unit 14 of the composite machine, the specified application is downloaded from the memory area corresponding to the URL in the host computer. Thus, the application automatically starts to be installed. Needless to say, a URL having an application allocated thereto input via the operation screen of the external computer 12 may be transmitted to a network. The URL may be received by the image forming apparatus via a network interface and input to the core unit 10, not using the operation unit 14.

Figure 10:
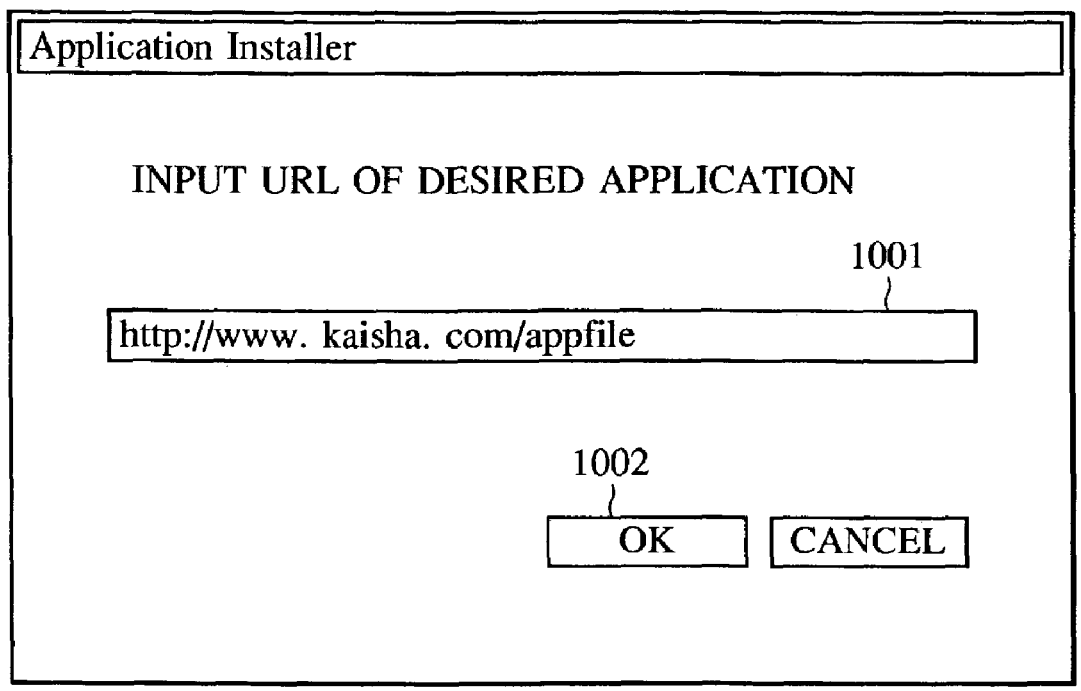
FIG. 10 shows an example of a screen viewed when an application installer installs according to the second embodiment.

FIG. 10 shows an example of a screen used when an application is installed by the application installer according to the second embodiment. This screen is displayed in the operation unit 14 of the composite machine 100 when the installation is specified on the main screen (not shown) of the application installer 907. Specifically, the URL representing the host computer 11 having application information to be installed stored therein is input in a text field 1001. The application installer starts to download the application from the host computer 11 in response to clicking an OK button 1002. Thus, the installation is carried out. The screen of FIG. 10 is restored to the application installer main screen (not shown) by clicking a cancel button on the screen.

Figure 11:
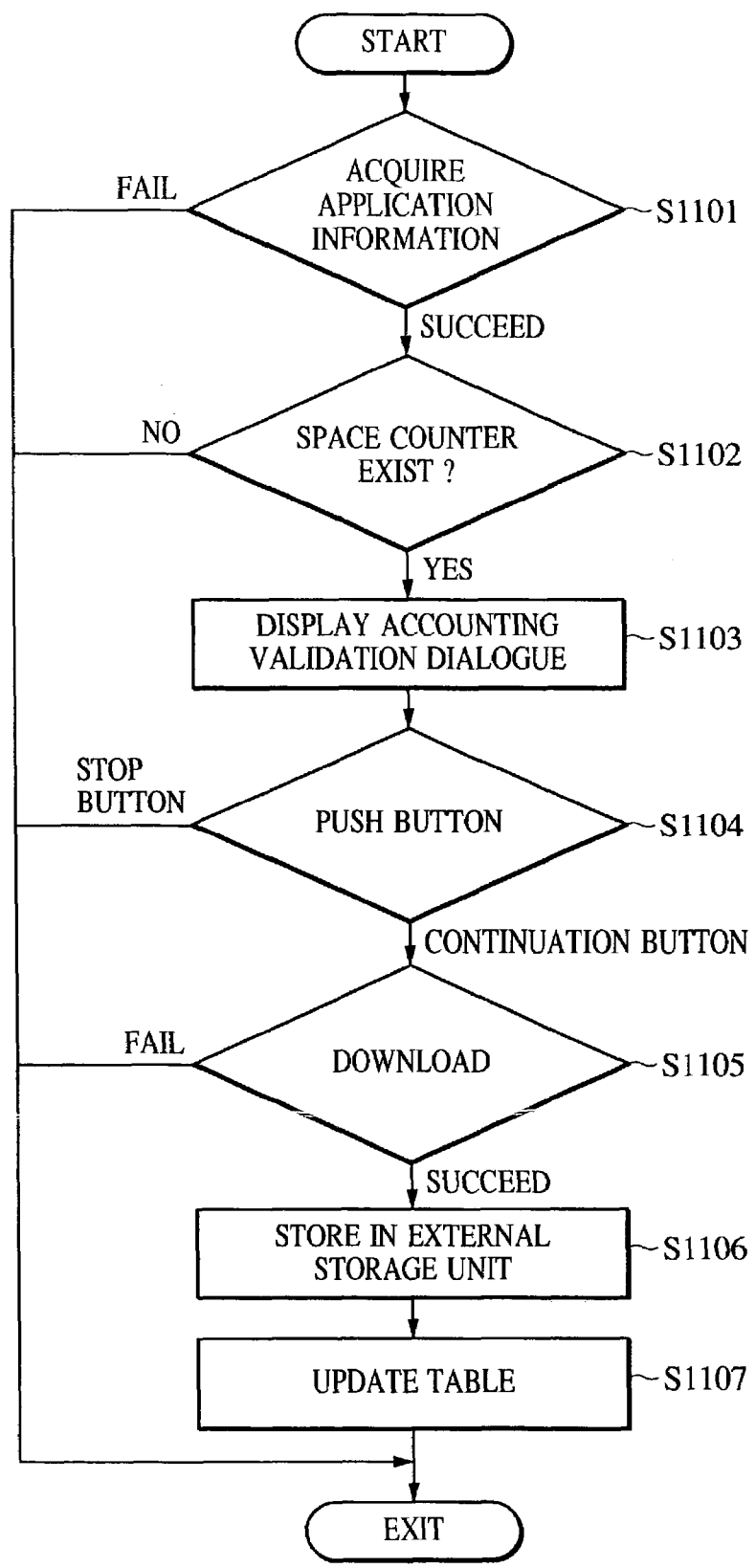
FIG. 11 is a flowchart of the processes executed after the OK button of FIG. 10 is pushed according to the second embodiment.
Figure 13:
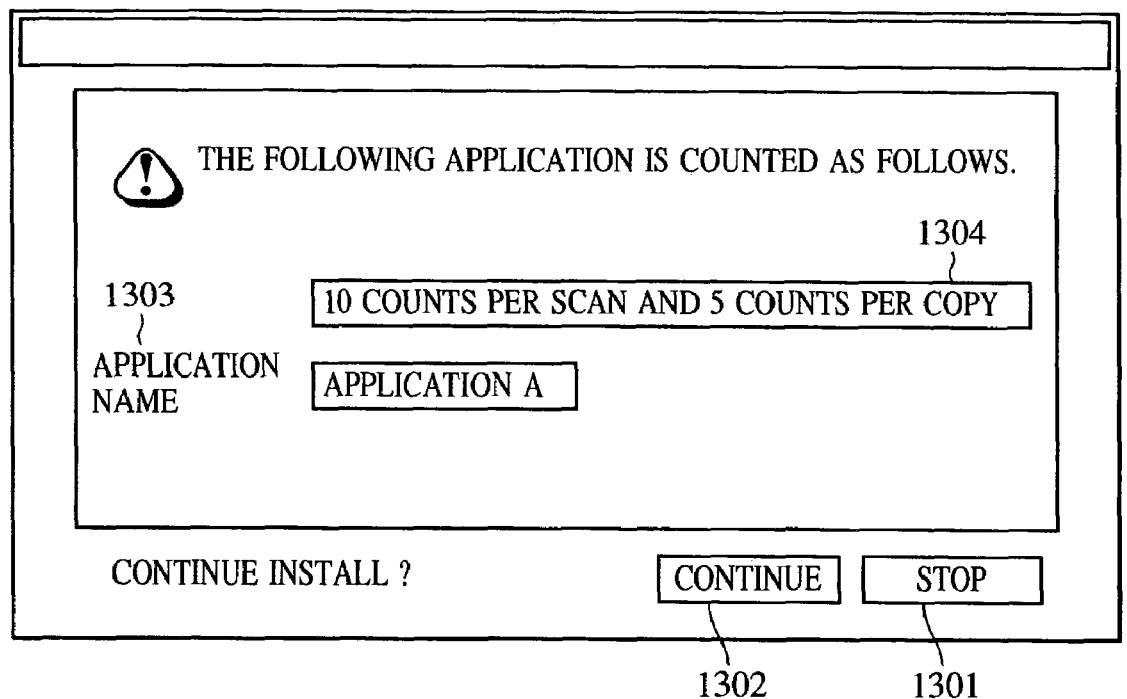
FIG. 13 shows an example of a count unit warning dialog box displayed at the installing of the application executed according to the second embodiment.

FIG. 11 is a flow chart showing the operations to be carried out after the OK button is clicked. FIG. 12 shows an example of a counter number—application ID table according to the second embodiment. FIG. 13 shows an example of a count-unit warning dialog box displayed when an application is installed according to the second embodiment. Hereinafter, the flow chart of FIG. 11 will be described with reference to FIGS. 11 to 13.

The OK button 1002 is clicked. First, the application installer 907 acquires the application information existing at the location specified in the text field 1001 at step S1101. FIG. 14 shows the elements constituting the application information by way of example.

FIG. 14 shows an example of the configuration of the application information according to the second embodiment. In this case, as an example of the application information, a vendor name, an application ID and an application name as identifiers for the application, version, the latest updating date, a use counter number, a counter type, a count-up unit, a use memory, and an archive file URL from which a program is obtained are listed.

FIG. 11 is described again. If the application installer 907 can acquire the application information which is a suitable example of the attribute information of a program in step S1101, the processing proceeds to step S1102. If the application information is not acquired, the processing terminates. In step S1102, the application installer 907 which is a suitable example of a recognizing means according to the present invention determines and recognizes which counters of the type specified by the application information are free in response to the acquisition of the application information. If no free counter numbers can be recognized, that is, counters which can manage the use amounts of a program newly added, that is, input via the network interface unit (input unit) of the composite machine 100 from the host computer 11 or the like can not be recognized, the processing terminates.

On the other hand, if free counters can be recognized for all the types provided in the application information at the step S1102, the processing proceeds to step S1103. In step S1103, a recognition dialog with respect to a count-up unit (FIG. 13) is displayed in the operation unit based on the application information. For example, the application name and use-accounting counted up every time the application is started are displayed. Then, the processing proceeds to step S1104, where it is determined which button is clicked on the dialog screen (FIG. 13). If it is determined that the stop button 1301 is clicked, the processing terminates. If it is determined that the continuation button 1302 is clicked, the processing proceeds to step S1105. In step S1105, the main part of the program is trially downloaded based on the archive file URL information provided in the application information. If the main part of the program fails to be downloaded at the step S1105, an error is displayed, if necessary, and the processing terminates. On the other hand, if it is successfully downloaded, the processing proceeds to step S1106. In step S1106, the application installer (counter-managing means) the downloaded program is stored in the memory unit 6, so that the program is ready to be used. Then, the processing proceeds to step 1107, where the application installer additionally stores a pair of the counter number and the application ID contained in the application information recognized in step S1102 in the counter number—application ID table for updating. The application management module 204 initializes the use amounts of the counters recognized by the application installer, if necessary, and terminates the processing. If a free counter can not be recognized, that is, the application installer recognizes that the number of counters is deficient, new counters may be prepared so as to correspond to new applications and initialized to be used.

Referring to FIG. 13, the name of an application to be added is displayed on the application display area, and count-up information e.g., accounting information) obtained when the application uses the scan function and the copy function, provided by the composite machine 100, is displayed on the count-up information display area 1304. Accordingly, when the application is executed, a user recognizes the count-up information which depends on whether the function should be used or not and thereafter, can install the application.

FIG. 12 shows an example of the counter number—application ID table of the second embodiment. As shown in FIG. 12, the tables in which the counter numbers given to the counters coordinate to the application IDs each of which is a typical example of the identifier for an application are prepared for a monochromatic printer function, a color printer function, a monochromatic copy function, a color copy function, and a scanner function, respectively. The functions which are provided by the image forming apparatus are not restricted to the above-described ones. For example, finishing functions such as a stipple function, a bookbinding function, or the like are included. Any function is available, provided that the function is provided by the image forming apparatus and the use amounts (e.g., use number, use time) of the function can be recognized. "0xFFFFFF" is a code which represents that the counter is free. In this example, as shown in FIG. 12, one application having the application information of FIG. 14 is installed in the image forming apparatus. The scan counter with a counter number of 1 and the general-use counter with a counter number of 1 are allocated to the application with an application ID of 11. When a predetermined application causes a predetermined operation (e.g., the operation of a scan function, the operation of a print function, the operation of a finishing function, and so forth) using functions of the image forming apparatus, the counters with the counter numbers defined in the above-described tables count up, since the above-described tables are provided. Thus, the use amounts can be managed for each application.

As described above, the composite machine 100 is provided with the application management module 204 which manages the use amounts for each program using the counters. In response to the information representing the attribute of the application which is input to the composite machine 100, the application installer 206 recognizes the counters with which the use amounts of the application with an application ID which is an example of the identification information of a program to be added can be managed.

The application management module correlates the added program with the counters recognized by the application installer 206 and manages the counters.

The information for identifying a program includes all the information with which the program can be identified. For example, in the case of an application program, the application ID, and the application name may be suggested. The module of application programs provided in the form of a file includes the name of the module or that of the file in which the application is stored. Needless to say, the module name, the file name and the like belong to the category of program identification information. Therefore, suggestibly, the program module integrated with the application information is previously input to the image forming apparatus via the network interface, and is stored in the memory unit of the image forming apparatus, and in response to this, it is determined whether the program module is correlated with the counters or not.

The installed application executes a command group (see FIG. 5) for instructing job operations as in the first embodiment, and can thereby control a reader unit 1, a printer unit 2, a finisher unit 15, and so forth. The functions of different types of composite machines can be carried out. The details have been described in the first embodiment. Thus, the repeated description is omitted.

Figure 15:
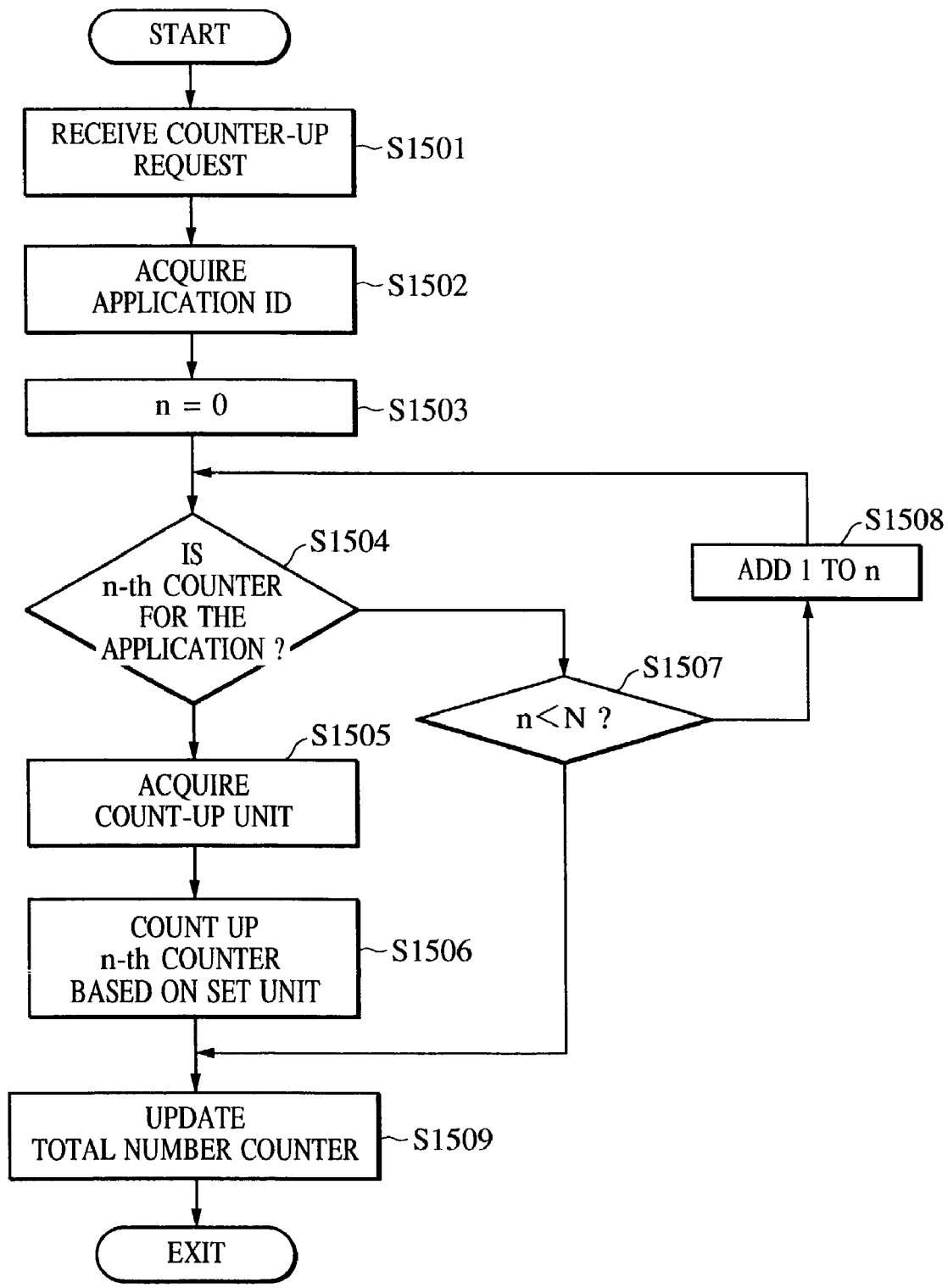
FIG. 15 is a flowchart of the processes executed by a counter updating means when count-up is carried out according to the second embodiment.

FIG. 15 is a flow chart showing the sequences of operations carried out by a counter updating means when count-up is executed in the application management module. Hereinafter, operations carried out when count-up is requested for each counter will be described with reference to the flow chart of FIG. 15. First, in S1501, the application management module receives a count-up request, e.g., from the core unit. The processing proceeds to step S1502. In S1502, the module acquires the ID of the application which requests the updating. The processing proceeds to step S1503. In step 1503, 0 is assigned to the variable n. The processing proceeds to step S1504. In step S1504, it is checked whether the n-th counter is assigned to the application with the application ID acquired in step S1502 or not by reference to the table. If the n-th counter is assigned to the application with the application ID acquired in step S1502, the processing proceeds to step S1505.

In step S1505, the application management means acquires a count up unit for the present job type from the application information. The processing proceeds to step S1506. The n-th counter counts up in the unit acquired in step 1505. The processing proceeds to step S1509. In step S1509, the application management means causes a counter for counting the total number to count up in the unit specified based on the application information. Thus, the processing terminates. On the other hand, if the application management means determines in step S1504 that the n-th counter is not assigned to the application with the application ID acquired in step S1502, the processing proceeds to step S1507. In step S1507, it is determined whether the variable n is smaller than the total number N for the counter for the application or not. If n<N, the n value is increased by 1 in step S1508, and the processing is returned to step S1504. If n<N is not satisfied in step S1507, the processing proceeds to step S1509, and only the counter for counting the total number is caused to count up in the unit specified in the application information. Then, the processing terminates.

FIG. 16 illustrates an example of counters contained in the composite machine according to the second embodiment. In this example, six types of counters, that is, copy counters (monochromatic), scan counters, print counters (monochromatic), color copy counters, color print counters, and general-use counters are provided. For each of the six types, one counter for counting the total number is prepared, and N counters (the counter numbers of 1 to N) are prepared for the different applications. When a monochromatic copy job is carried out, the copy counter is caused to count up every time copying is carried out on one sheet. At this time, the increment by the counter is increased in an amount defined in the application information. Similarly, when a scan job, a monochromatic print job, a color copy job, and a color print job are carried out, the scan counter, the print counter, the color copy counter, and the color print counter are caused to automatically count up every predetermined operation by a controller. The general use counter can be caused to count up at timing for the application by instruction of the application via the general counter control API.

Specifically, when a scan job is executed by the application with an application number ID of 11 under the condition of FIG. 14, the count by the counter designated by (a) in FIG. 16 is increased by ten every time scanning is carried out on one sheet. Moreover, if the general-use counter API is called every time the application with an application ID of 11 issues a job, the count by the counter designated by (b) in FIG. 16 is increased by one.

Figure 17:
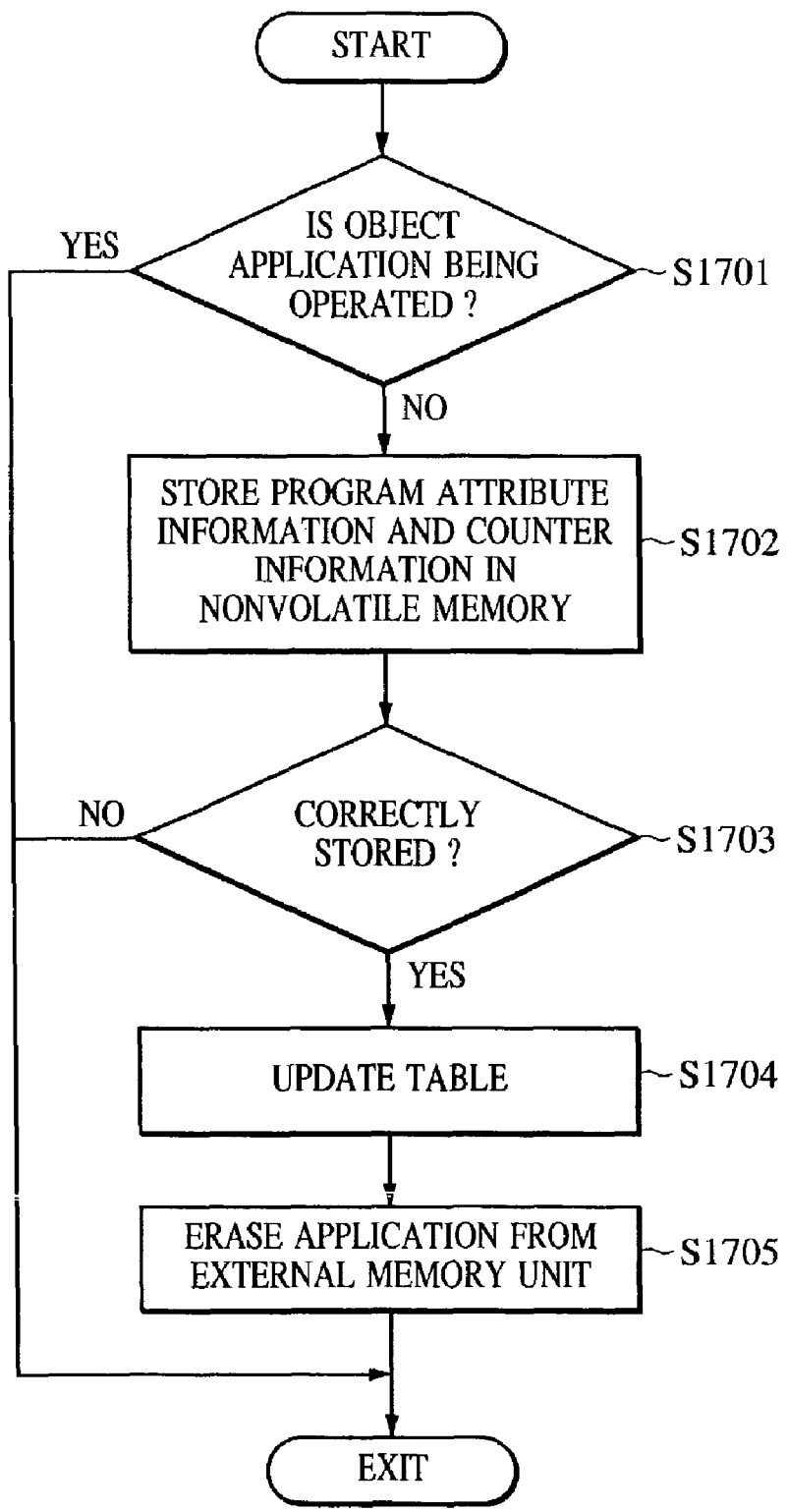
FIG. 17 is a flowchart of the processes executed when the application installed in the composite machine is uninstalled according to the second embodiment.

FIG. 17 is a flow chart showing the sequence of operations carried out when an application installed in the composite machine is uninstalled according to the second embodiment. Hereinafter, the operations carried out when an application installed in the image forming apparatus is uninstalled will be described with reference to the flow chart of FIG. 17. First, an application installer 203 checks whether the application specified at step S1701 is under operation or not. If the application is under operation, the uninstallation terminates immediately. If the application is not under operation, it can be safely uninstalled, and thus, the processing proceeds to step S1702. In step 1702, the application installer 203 (recognizing means) retrieves the information of the counter correlated with the application uninstalled in step S1702 and the application information from the counter number—application ID table, and recognizes and stores it in a nonvolatile memory provided in the image forming apparatus. The processing proceeds to step S1703.

In step S1703, it is checked whether the information has been correctly stored in the nonvolatile memory. In the case where the information has been correctly stored, the processing proceeds to step S1704. In the case where the information has not been correctly stored, the application is not uninstalled in practice, and the processing terminates. In step S1704, the application management module 204 (counter managing means) updates the counter number—application ID table, and releases the counter to which the application ID of the application to be uninstalled is allocated so that the counter becomes free. In the next step, step S1705, the application is erased from the memory unit 6 for uninstallation. Thus, the processing terminates.

As described above, according to this embodiment, the warning dialog box with respect to the count-up information is displayed when an application is installed. Accordingly, a user can install the application after he or she accepts the count-up unit every predetermined operation. Moreover, use of the general use counter is enabled based on the applications. Accordingly, the use number and the processing amount can be managed for each application.

When an application is uninstalled, the application information and the information of the used counters are stored in a memory unit in the apparatus. Thus, the application can be installed and uninstalled freely and repeatedly without the count information being damaged.

An embodiment of the present invention in which a predetermined operation of an application is restricted by an upper limit set for each application and for each function will be described with reference to FIGS. 18 and 19.

Figure 18:
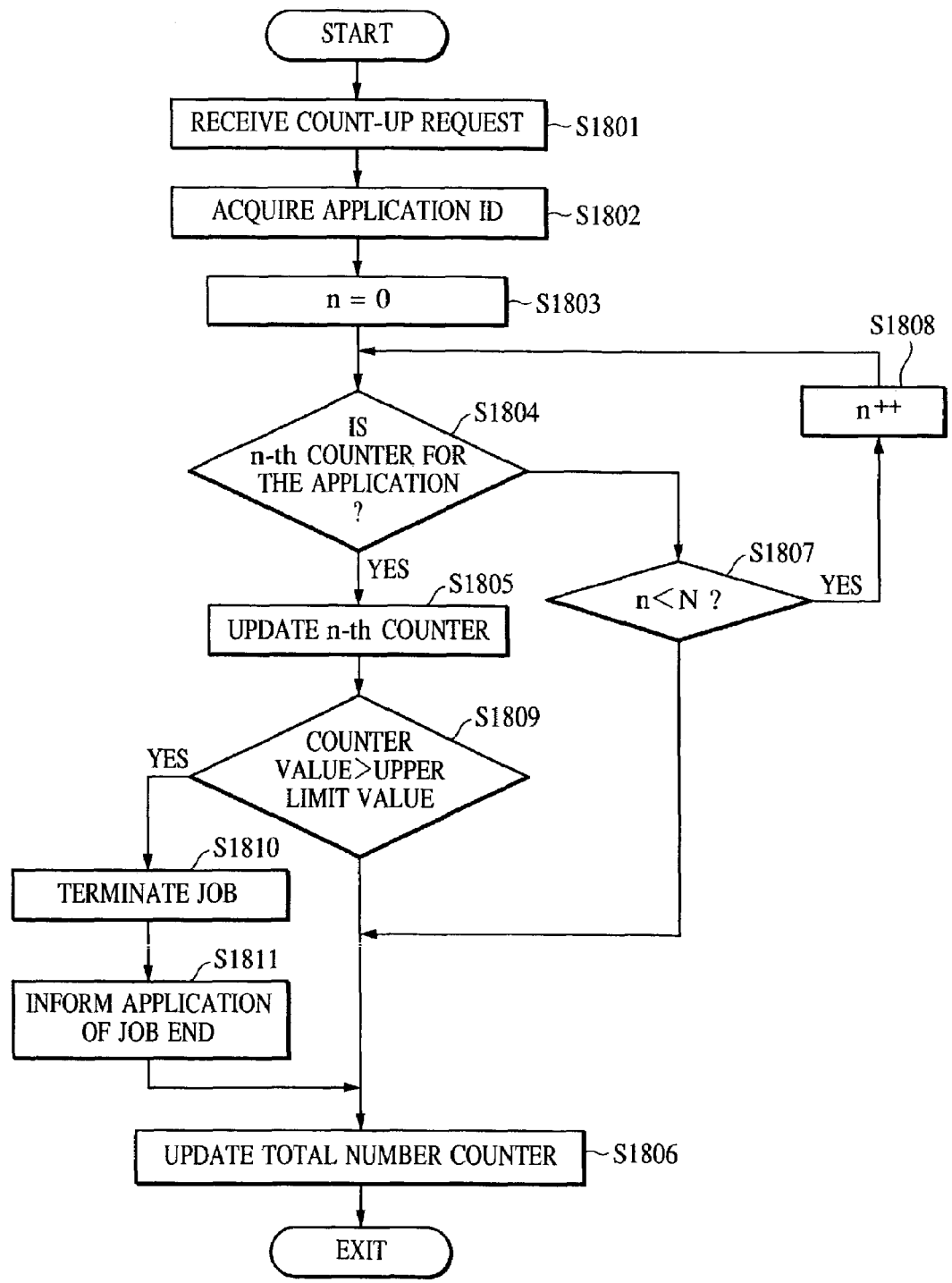
FIG. 18 illustrates the processes which a counter updating means and an application counter upper limit management means execute for each application.

FIG. 18 is a flow chart showing the sequence of operations carried out by a counter updating means and a counter upper limit managing means when a counter is updated according to the first embodiment. In FIG. 18, the upper limit managing means is added to the counter updating means shown in FIG. 6. The sequence of operations carried out by the counter managing means and the counter upper limit managing means for update of a counter will be described with reference to the flow chart of FIG. 18.

First, at step S1801, a counter update request is received from the core unit 10 shown in FIG. 1. The processing proceeds to step S1802. In step S1802, the application I of the application which requests the update of a counter is acquired. The processing proceeds to step S1802. In step 1802, the application ID of the application which requests the update is acquired. The processing proceeds to step S1803. In step S1803, 0 is assigned to the variable n. The processing proceeds to step S1804. In step S1804, it is checked whether the n-th counter is assigned to the application with the application ID acquired in step S1802 or not by reference to the table. If the n-th counter is allocated to the application with the application ID acquired in step S1802, the processing proceeds to step S1805. In step S1805, the n-th counter for the present job type is updated. The processing proceeds to step S1809. On the other hand, if it is determined in step S1804 that the n-th counter is not allocated to the application with the application ID acquired in step 1802, the processing proceeds to step S1807. In step S1807, it is determined whether the variable n is smaller than the total number N of the application counter or not. If n<N, n is increased by 1 at step S1808. The processing is returned to step S1804. If it is determined in step S1807 that n<N is not satisfied, the processing proceeds to step 1806. In step S1806, only the counter for counting the total number is updated, and then, the processing terminates.

In step S1809, the n-th upper limit for the present job is referred in the counter upper table shown in FIG. 19, and is compared with the counter value updated at the step S1805. If the comparison result shows that the counter value does not exceed the upper limit, the total number counter is updated in step S1806, and the processing terminates. If the counter value exceeds the upper limit, the core unit 10 of FIG. 1 is instructed on the forced termination of the job in step 1810. The processing proceeds to step S1811. In step S1811, an event representing the forced termination of the job is sent and posted to the application (205 in FIG. 2) which issued the job corresponding to the application ID acquired to at the step S1802. In step S1805, the total number counter is updated, and the processing terminates.

According to this embodiment, the job is forcibly terminated in step S1810. However, the application may cause a predetermined operation. In particular, an event representing that the counter exceeds the upper limit may be sent and posted to the application to which issued the job without the job being forcibly terminated. Referring to the predetermined operation, the application to which the event is posted does not issue succeeding new jobs, warns a user, e.g., that the use license of the application which is an execution object is deficient, displays in the operation unit 14 of the composite machine 100 a dialog box for promoting a new license file about the application to be installed, or communicates these contents audibly by means of a speaker (not shown) provided for the computer, and so forth. Similarly, display information for displaying a dialog box is transmitted to the host computer or the network server to be displayed on the screen of the network server or the host computer.

FIG. 19 shows an example of a counter upper limit management table contained in the composite machine 100. In this example, upper limits for three types of counters, that is, copy counters, print counters, and scan counters are provided. N counters (counter numbers of 1 to N) are prepared for each type and for different applications.

In the case where the contents of the counter number—application ID table are the same as shown in FIG. 4, the upper limit designated by (a) in FIG. 19 is referred to by the application with an application ID of 11. The upper limit designated by (b) in FIG. 19 is referred to by the application with an application ID of 51. For example, when the application with an application ID of 11 executes a copy job, the upper limit designated by (c) in FIG. 19 is referred to. Similarly, when the application executes a print job, the upper limit designated by (c) in FIG. 19 is referred, to. When the application executes a scan job, the upper limit designated by (d) in FIG. 19 is referred to. Moreover, in the case where a print job, a scan job, or a copy job is submitted by a remote host computer, the upper limit corresponding to the application ID of the application issuing the job is referred to, provided that the application ID has been registered in the table. As described with reference to FIG. 7, the job is rejected, if the application ID of the application issuing the job is not registered in the table. Therefore, in this case, the upper limit does not need to be registered. For example, an OCR application for outputting data including text information which is coded to an ASCII code by recognizing and extracting character information from an image and a scanner function correlated with the OCR application may be combined. The use amount can be limited, grasped, and accounted based on the function of the composite machine combined with the application which can provide an additional value for the machine. In particular, in a case where the upper limit is set for the combination of the program of the OCR application with the scanner function of the composite machine 100 so that the composite machine 100 can not be used, the application management module 905 controls a controller via the API to limit the function of the composite machine 100. In addition, examples of the combination of an application program with the function of the composite machine 100 include the combination of a high-quality image processing application with a printer function, that of an image processing application with a scanner function, that of an office application for spreadsheet or document preparation with a printer, a facsimile, or a scanner, and so forth.

As described above, the respective functions of the image forming apparatus and the count values and the upper limits of which each number is equal to that of the applications using the respective functions can be managed. Moreover, the count values can be summed up for each application and for each function and counted, and simultaneously, the upper limits can be managed. Thereby, the use amount of an application can be counted, and the upper limit can be managed every predetermined operation of the application.

For example, in the case where a copy application corresponds to a counter number of 6, the use of the copy application causes the copy counter corresponding to the counter number of 6 to count up, and the copy function is limited by the upper limit corresponding to the counter number of 6. In the case where the upper limit is set by a predetermined license mechanism, the application-usable number can be provided depending on a license. Thus, pre-accounting based on the use number of the application becomes possible. Examples of the functions of the image forming apparatus may include facsimile reception or transmission, and so-called bookbinding processing such as finishing, bookbinding, punching, or the like in addition to copy, print, and scan. Thus, the upper limit can be set for an application using a function, that is, for the combination of a predetermined application with the function operated by the application. Accordingly, the control of a predetermined function can be limited by the application, and the output of a job which is issued based on the control of the function by the application can be limited of forcedly erased.

Other Embodiments

The operations described in the present specification and shown in FIGS. 3, 6, 8, 11, 15, 17, and 18 are carried out according to externally installed programs and by means of an information-processing device and the image-forming apparatus. An information group including the programs may be supplied to the information processing device and the image forming apparatus from memory media such as CD-ROM, flash memories, FD, and so forth or from external memory media via a network. Thus, the present invention may be applied.

Needless to say, a memory medium in which the program code of the software executing the functions described in the embodiments is recorded may be supplied to a system or the apparatus, and a computer (or CPU or MPU) for the system or apparatus reads and executes the program code stored in the memory medium, as described above. Thus, the objects of the present invention can be also achieved.

In this case, the program code itself read from the memory medium carries out the novel functions of this embodiment.

Accordingly, the memory medium having the program code recorded therein constitutes this embodiment. Examples of the memory medium for supplying the program code include a floppy disk, a hard disk, an optical disk, opto-magnetic disk, DVD, CD-ROM, a magnetic tape, a nonvolatile memory card, ROM, EEPROM, and the like.

The functions described in the embodiments are realized by execution of the program cord read by the computer, and moreover, OS (operating system) or the like operating under the computer may carry out at least a part of the practical processes based on instruction by the program code, whereby the operations described in the embodiments are performed. Moreover, needless to say, the program code read from a memory medium may be written in a memory of a function-extension board inserted in the computer or a function-extension unit connected to the computer, and thereafter, CPU or the like provided in the function-extension board or the function-extension unit carries out at least a part of the practical processes, whereby the functions described in the embodiments are realized.

According to the embodiments of the present invention, a plurality of counters are prepared in the image forming apparatus. Applications and the counters are dynamically correlated with each other when the applications are installed. Counters free when the applications are installed can be dynamically allocated. The counters are released when the applications are uninstalled. Thereby, count information can be properly managed for each application even while an application is added or deleted. Moreover, thereby, accounting corresponding to the use amount of an application can be properly distributed to an application vendor which has developed the application in the image forming apparatus.

For the processes provided by the programs in the image forming apparatus, the count information can be individually managed. Thus, an image forming apparatus can be provided in which the use amount of each program can be easily managed.

The counters are managed so as to be released in response to the deletion of the programs installed in the image forming apparatus. Thus, an image forming apparatus can be provided in which undesired counters can be prevented from increasing in number, and the use amount of each program being practically used in the image forming apparatus can be easily managed.

The counters are managed so as to be released in response to addition of the attribute information of each program in the image forming apparatus. The programs can be securely correlated with the counters and managed in the form of a table. Thus, an image forming apparatus can be provided in which the use amount of a program being used in the image forming apparatus can be securely acquired and displayed to be managed.

Moreover, the use amount is managed for each function of the image forming apparatus utilized by the program. Therefore, accounting or the use amount can be managed depending on the value added to by the application, the process provided by the application, and the function provided by the composite machine.

The counter control APT which has high portability and re-usability and is interpreted and executed by the interpreter is provided. Accordingly, the counter control program can be easily prepared, and also, can be easily reused and ported to other image forming apparatus.

AS mechanism is provided in which the use amount of each program is managed depending on the function of the image forming apparatus provided by the program. Thus, an image forming apparatus can be provided in which the use condition of each program can be properly grasped based on the functions of the image forming apparatus and the program configuration.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus for printing, in which programs of one or more types for controlling image processes that are provided by the image forming apparatus are installed, comprising:

means for managing the use amount of each program for controlling the image processes by use of a predetermined number of counters, wherein the counters are reused by plural programs for controlling the image processes;

means for recognizing the counter, from among those counters, which corresponds to a given one of the programs for controlling the image processes and can manage the use amount of that program for controlling the image processes;

means for correlating that program for controlling the image processes with the counter recognized by the recognizing means, to manage that counter;

means which can set an upper limit on the use amount of each program for controlling the image processes for the use amount managing means; and means for controlling processing by the image forming apparatus based on the upper limit on the use amount set by the setting means for each of the types of the programs for controlling the image processes, wherein, in response to deletion of a program stored in the image forming apparatus, the counter corresponding to the program which is deleted recognized by the recognizing means is released so that that counter can be reused by a newly installed program in the image forming apparatus and printing means for printing print data to recording sheets.

2. An image forming apparatus according to claim 1, wherein the use amount managing means manages the use amount of the given program for controlling the image processes based on the execution number of that program, the use time of that program, or the predetermined-operation number of the image forming apparatus caused by that program.

3. An image forming apparatus according to claim 1, wherein the use-amount managing means controls the counter to manage the use amount of the program for controlling the image processes, using a counter control application program interface which is executed by means of an interpreter.

4. An image forming apparatus according to claim 1, further comprising an issuing means for issuing a job based on the program for controlling the image processes managed by the use amount managing means, wherein the setting means sets an upper limit on the counter managed by the use amount managing means, and if the count by the counter managed by the use amount managing means exceeds the upper limit of the use amount set for each program for controlling the image processes, the controlling means controls the image forming apparatus so that the job issued by the issuing means is forcibly terminated.

5. An image forming apparatus according to claim 1, wherein if the counter exceeds the counter upper limit, the upper limit managing means issues an event to the program for controlling the image processes so that the program caries out a predetermined operation.

6. An image forming apparatus according to claim 1, wherein, in a case where the upper limit is set by the setting means so that the image forming apparatus cannot be used with respect to combinations of the program for controlling the image processes with the functions of the image forming apparatus including at least one of a scanner, a facsimile, and a printer, the controlling means limits the functions of the image forming apparatus.

7. A method of controlling an image forming apparatus for printing, in which programs of one or more types for controlling image processes that are provided by the image forming apparatus are installed, comprising the steps of:
managing the use amount of each program for controlling the image processes by use of a predetermined number of counters, wherein the counters are reused by plural programs for controlling the image processes;
recognizing the counter which corresponds to the identification information of a given one of the programs for controlling the image processes and can manage the use amount of that program for controlling the image processes;
correlating that program for controlling the image processes with the counter recognized in the recognizing step, to manage the counter;
optionally setting an upper limit on the use amount of each program for controlling the image processes of each program for the use amount managing step; and
controlling processing by the image forming apparatus based on the upper limit on the use amount set in the setting step for each of the types of the programs for controlling the image processes,
wherein, in response to deletion of a program stored in the image forming apparatus, the counter corresponding to the program which is deleted recognized by the recognizing means is released so that that counter can be reused by a newly installed program in the image forming apparatus and printing means for printing print data to recording sheets.

8. A method of controlling an image forming apparatus according to claim 7, wherein, in the use amount managing step, the use amount of the program for controlling the image processes is managed based on the execution number of the program, the use time of the program, or the predetermined-operation number of the image forming apparatus caused by the program.

9. A method of controlling an image forming apparatus according to claim 7, wherein, in the use-amount managing step, the counter is controlled to manage the use amount of the program for controlling the image processes, using a counter control application program interface which is executed by means of an interpreter.

10. A method of controlling an image forming apparatus according to claim 7, further comprising a step of issuing a job based on the program for controlling the image processes managed in the use amount managing step,
wherein, in the setting step, an upper limit on the counter managed in the use amount managing step is set, and if the count by the counter managed in the use amount managing step exceeds the upper limit on the use amount set in the setting step for each program for controlling the image processes, in the controlling step, the image forming apparatus is controlled so that the job issued in the issuing step is forcibly terminated, or the issuing of the job is limited.

11. A method of controlling an image forming apparatus according to claim 7, wherein, in the upper limit managing step, if the counter exceeds the counter upper limit, an event is issued to the program for controlling the image processes so that the program carries out a predetermined operation.

12. A method of controlling an image forming apparatus according to claim 7, wherein, in the controlling step, in a case where the upper limit is set in the setting step so that the image forming apparatus cannot be used with respect to combinations of the program for controlling the image processes with the functions of the image forming apparatus including at least one of a scanner, a facsimile, and a printer, the functions of the image forming apparatus are limited.

13. A computer-readable storage medium storing, in executable form, a control program, the control program being executed in an image forming apparatus for printing, in which programs of one or more types for controlling image processes that are provided by the image forming apparatus are installed,
wherein the control program comprises code execution of which causes the image forming apparatus to carry out the steps of:
managing the use amount of each program for controlling the image processes by use of a predetermined number of counters, wherein the counters are reused by plural programs for controlling the image processes;
recognizing the counter which corresponds to the identification information of a given one of the programs for controlling the image processes and can manage the use amount of that program for controlling the image processes;
correlating that program for controlling the image processes with the counter recognized in the recognizing step, to manage the counter;
optionally setting an upper limit on the use amount of each program for controlling the image processes of each program for the use amount managing step; and
controlling processing by the image forming apparatus based on the upper limit on the use amount set in the setting step for each of the types of the programs for controlling the image processes,
wherein, in response to deletion of a program stored in the image forming apparatus, the counter corresponding to the program which is deleted recognized by the recognizing means is released so that that counter can be reused by a newly installed program in the image forming apparatus and printing means for printing print data to recording sheets.

14. An image forming apparatus for printing, in which programs for controlling image processes that are provided by the image forming apparatus are installed, comprising:
means for managing the use amount of each program for controlling the image processes by use of a respective counter;
means for recognizing the counter which corresponds to the identification information of a given one of the programs for controlling the image processes and to manage the use amount of the program for controlling the image processes;
means for correlating the program for controlling the image processes with the counter recognized by the recognizing unit to manage that counter; and releasing means for releasing the correlation between the program for controlling the image processes which is deleted and the counter corresponding to the deleted program in response to deletion of a program stored in the image forming apparatus so that that counter can be reused by a newly installed program in the image forming apparatus and printing means for printing print data to recording sheets.

* * * * *